UNITED STATES PATENT OFFICE.

VEITUS RADSPINNER AND WILLIAM H. MOSS, OF NEW RICHMOND, OHIO.

IMPROVED LUBRICATING COMPOUND.

Specification forming part of Letters Patent No. 29,005, dated July 3, 1860.

*To all whom it may concern:*

Be it known that we, VEITUS RADSPINNER and WILLIAM H. MOSS, both of New Richmond, Clermont county, Ohio, have invented a certain new and useful Lubricating Compound; and we do hereby declare the following to be a full, clear, and exact description thereof.

This compound is composed of the following ingredients in the stated proportions: thirty pounds of caustic lime, fifteen ounces of calcined magnesia, fifteen ounces of Husband's or Henry's magnesia, (carb. of mag.,) fifteen ounces of pulverized soapstone, fifteen ounces of chloride of lime, one gallon of alcohol, and water and oil in quantities hereinafter stated.

*Process of mixture.*—The lime is put into a barrel or other convenient utensil and thirty-two gallons of water added to it. All the other ingredients mentioned above, except the oil and alcohol, are then put in and well stirred up while blending. This mixture is then left three hours to settle, when the clear liquor is drawn off and the above-mentioned one gallon of alcohol well mixed with it. Fat oil—as linseed-oil, lard-oil, or fish-oil—is then taken and blended with the above mixture in equal proportions, by liquid measure, and the lubricating compound is complete.

This compound can be manufactured as above and sold at about thirty-five cents less per gallon than pure lard-oil, and is much more effective and durable for the purposes of lubrication than pure oil. Being less mobile than lard-oil, it stays in places from which the latter would be easily worked off. The compound has been practically tested against lard-oil on the cross-head slides of a steam-engine, the compound being used on one side and lard-oil on the other, in equal quantities, and applied in the same manner, when it was found that the compound at every test (varied by reversing sides, &c.) lasted fully one-third longer than the oil.

The principal ingredients of the above compound have the following properties, all necessary to its proper manufacture and its use as a perfect lubricator: The lime, in slacking and throwing off heat, dissolves all the ingredients mixed with it, and the alcohol serves to blend all and prevents their separation in use in lubricating. It has been proved that the ingredients of all previously-known compounds for lubricating will separate in use by the rubbing of the surfaces between which they are applied. The soapstone in our compound is of a polishing nature, and the chloride of lime and magnesia are of cooling natures and are preventives of "gumming."

We claim as new and of our invention herein—

The preparation of a homogeneous lubricating compound of the ingredients in the proportions and in the manner substantially as set forth, for application as a lubricator to all surfaces subject to friction.

In testimony of which invention we hereunto set our hands.

VEITUS RADSPINNER.
    W. H. MOSS.

Witnesses:
 GEO. H. KNIGHT,
 FRANCIS MILLWARD.